United States Patent [19]

Arakawa et al.

[11] Patent Number: 4,864,344
[45] Date of Patent: Sep. 5, 1989

[54] POWER FOCUS DEVICE IN A CAMERA

[75] Inventors: Kazuhiko Arakawa; Ryuichi Kobayashi, both of Kawasaki, Japan

[73] Assignee: Canon Kabushiki Kaisha, Tokyo, Japan

[21] Appl. No.: 298,337

[22] Filed: Jan. 17, 1989

Related U.S. Application Data

[63] Continuation of Ser. No. 103,303, Oct. 1, 1987, abandoned.

[30] Foreign Application Priority Data

| Oct. 3, 1986 | [JP] | Japan | 61-235811 |
| Oct. 3, 1986 | [JP] | Japan | 61-235812 |
| Oct. 3, 1986 | [JP] | Japan | 61-235813 |
| Oct. 3, 1986 | [JP] | Japan | 61-235814 |

[51] Int. Cl.$^4$ ............................................. G03B 3/00
[52] U.S. Cl. .................................. 354/400; 354/195.1; 354/409
[58] Field of Search ............... 354/195.1, 289.1, 400, 354/409, 195.13

[56] References Cited

U.S. PATENT DOCUMENTS

| 2,618,209 | 11/1952 | Silent | 354/400 |
| 3,486,432 | 12/1969 | Norwood | 354/195.13 |
| 3,735,686 | 5/1973 | Brewer et al. | 354/400 |
| 4,293,206 | 10/1981 | Tokutani et al. | 354/400 |
| 4,568,165 | 2/1986 | Ishibashi | 354/195 |
| 4,674,854 | 6/1987 | Kawamura et al. | 354/289.1 |
| 4,699,491 | 10/1987 | Ishimura | 354/289.1 |

FOREIGN PATENT DOCUMENTS 61-196214 8/1986 Japan.

Primary Examiner—Russell E. Adams
Attorney, Agent, or Firm—Fitzpatrick, Cella, Harper & Scinto

[57] ABSTRACT

A power focus device in a camera has a manually rotatively operated focus ring, a lens driving drive source for driving a focusing lens, and a pulse generating device operatively associated with the rotation of the focus ring to generate a pulse signal conforming to the amount of rotation of the focus ring. A focus ring rotation direction detecting device detects the direction of rotation of the focus ring from the pulse signal, a focus ring rotation amount detecting device detects the amount of rotation of the focus ring from the pulse signal, and a drive direction setting device sets the direction of drive of the lens driving drive source on the basis of the result of the detection in the focus ring rotation direction detecting device. A drive amount setting device memorizes the result of the detection in the focus ring rotation amount detecting device and sets the memorized value as the amount of drive of the lens driving drive source. A drive source control device control the lens driving drive source in accordance with the direction of drive set in the drive direction setting device and the amount of drive set in the drive amount setting device. A reversing device immediately reverses the lens driving drive source, changes the setting in the drive direction setting device, returns the drive amount setting device to its initial state, and immediately reverses the lens driving drive source when the focus ring has been rotatively operated in a direction to drive the lens driving drive source in a second direction when the lens driving drive source is being driven in a first direction.

47 Claims, 4 Drawing Sheets

POWER FOCUS DEVICE IN A CAMERA

This application is a continuation of application Ser. No. 103,303, filed 10-1-87 abandoned.

FIELD OF THE INVENTION

The present invention relates to a power focus device in a camera designed to convert a manual focusing operation into an electrical signal and drive and control a drive source such as a motor by the electrical signal, thereby causing a focusing lens to faithfully follow the focusing operation and be driven.

BACKGROUND OF THE INVENTION

Many recent cameras, and the interchangeable lenses thereof, have an auto focus device (hereinafter referred to as AF) mounted therein, and in such cameras and interchangeable lenses, the focusing operation by the human eye and hand is unnecessary, and this makes such cameras and interchangeable lenses very easy to use, which in turn leads to an increased demand for such cameras with AF.

However, cameras with AF or interchangeable lenses with AF suffer from the disadvantage that the photographer cannot take intentionally out-of-focus photographs even if he or she wants to do it, and in addition, suffers from the disadvantage that the shutter does not operate until the camera or the lens is in focus for an object to be photographed and therefore, the photographer is liable to miss a momentary photographing chance and thus, cameras with AF or interchangeable lenses with AF have been awkward to use to those persons who want to freely use various photographing techniques to take a variety of photographs or those persons who want to seize momentary photographing chances even if the resultant photographs will become more or less out of focus. Therefore, when a photograph which need not be strictly in focus for a particular object to be photographed is to be taken or when an intentionally out-of-focus photograph is to be taken, use has heretofore been made of a conventional interchangeable lens or camera in which focusing s accomplished by only a manual operation. However, in various photographing situations, there arises the necessity of utilizing AF to take in-focus photographs or the necessity of utilizing a manual focus mechanism (hereinafter referred to as MF) to take intentionally out-of-focus photographs. Therefore, it is desirable that both the auto focus operation and the manual focus operation can be accomplished by an interchangeable lens.

With this background, there have been manufactured interchangeable lenses capable of accomplishing both the auto focus operation and the manual focus operation. These conventional interchangeable lenses are designed such that during the auto focus, lens driving is effected by a motor and during the manual focus, a clutch is changed over to thereby manually effect lens driving. Therefore, such interchangeable lenses can accomplish photographing by auto focus and photographing by manual focus and can therefore cope with various photographing situations.

In these conventional interchangeable lenses, however, dog clutch is used to change over the AF and the MF, and this has led to the undesirable possibility that the lens is moved due to a mechanical shock produced during the change-over of the clutch and to the meshing tolerance of the clutch, and in addition, has led to the disadvantage that the operation of changing over the clutch is cumbersome. Also, in the manual focus operation, lens driving is effected manually, and this has led to the problem that the lens driving speed is slow as compared with the auto focus operation and moreover, a considerable operating force is required and this makes such an interchangeable lens awkward to use.

So, to solve the above-noted problems peculiar to such conventional interchangeable lenses, it has been proposed to mount, in the interchangeable lens, a so-called power focus device for driving the lens by a motor during the manual focus operation as well, together with AF, and several propositions have also been made for the power focus device.

The propositions heretofore made for the power focus device include the proposition of using a button switch instead of the conventional focus ring and the proposition of varying the lens driving speed during the manual focus operation by the angle of rotation of a ring-like rotary switch operatively associated with the focus ring (U.S. Pat. No. 4,568,165).

However, in the former proposition, the operating method differs greatly between the button switch and the conventional focus ring and this has led to the disadvantage that the button switch is awkward to use, and in the latter proposition, even if the manual operation is stopped, movement of the lens is not stopped, and to stop the movement of the lens at this time, the rotary switch must be returned to its neutral position. This has led to the disadvantage that the rotary switch is poor in operability and moreover accurate focusing is impossible. Accordingly, it has been difficult to put the power focus device according to the aforementioned two propositions into practical use. Therefore, to make the power focus device practically usable, it is necessary that the manually operated operating member be designed so as to be capable of being operated by just the same operation as the conventional focus ring of MF and that the device for driving the lens be designed such that the movement thereof faithfully follows the movement of the hand.

Also, the applicant proposed Japanese Laid-Open Patent Application No. 196214/1986 (filed on Feb. 26, 1985, Application No. 37240/1985) as an improved proposition relating to the power focus device. The power focus device according to this proposition comprises a motor for driving a focus adjusting lens in response to a drive signal, a control signal generating part for providing the drive direction signal and position control signal of said motor in conformity with the amount of rotation and the direction of rotation of a manually operated rotary switch, a detecting circuit for detecting the drive direction signal and position control signal from said control signal generating part, a signal processing circuit for decoding the detection signal from said detecting circuit and supplying a drive signal to said motor in accordance with said decoding, and a lens information detecting circuit for detecting lens information such as focal length information and stop aperture information and inputting the lens information to said signal processing circuit. An embodiment disclosed in this proposition will hereinafter be described. When the user rotates said rotary switch to the left or right, a pulse signal is output from the contact of said rotary switch in response to said rotational operation. This signal is waveform-shaped by a flip-flop, whereafter it is temporarily memorized by a shift register and is read in at suitable timing by a CPU. On the other hand, the displacement of the signal caused by rotating the operating knob of said rotary switch to the right or left is detected by a phase detector, and the CPU determines the direction of drive of said motor in conformity with the detection signal of the phase detector, and drives said motor in conformity with the read-in signal from said shift register side and in said determined direction. In this manner, said motor is driven in conformity with the direction of rotative operation of said rotary switch and in conformity with the amount of rotative operation of said rotary switch. Consequently, by adjusting the rotated position of said rotary switch, focus adjustment can be accomplished.

SUMMARY OF THE INVENTION

It is an object of the present invention to provide a power focus device which is practical and convenient to use and moreover capable of precise focusing.

It is another object of the present invention to further improve the above-described power focus device using the rotary switch and to provide a novel power focus device which is excellent in practical use.

DESCRIPTION OF THE PREFERRED EMBODIMENT

An embodiment of the present invention will hereinafter be described with reference to the drawings.

Figure 1:
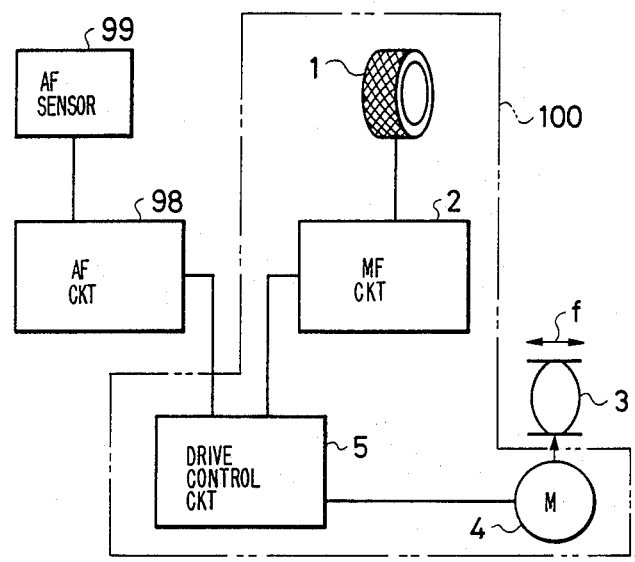
FIG. 1 schematically shows the construction of a camera or an interchangeable lens having the power focus device of the present invention and an auto focus device mounted therein.

FIG. 1 schematically shows the construction of a camera body equipped with a power focus device 100 and AF, or a focusing device in an interchangeable lens.

In FIG. 1, reference numeral 100 designates the power focus device of the present invention. The device 100, includes a focus ring 1 rotatively operated by fingers, a manual focus operation circuit 2 for calculating the amount of operation and so on necessary for focusing operation in response to the rotative operation of the focus ring 1, a drive source 4 such as a motor for driving a focusing lens 3 in the direction of arrow f (the direction of the optic axis), and a drive control circuit 5 for controlling the drive source 4. The drive control circuit 5 also provides a drive control circuit for AF, and an AF operation circuit 98 is connected to the circuit 5, and the output signal of a conventional AF sensor 99 is input to the AF operation circuit 98.

Figure 2:
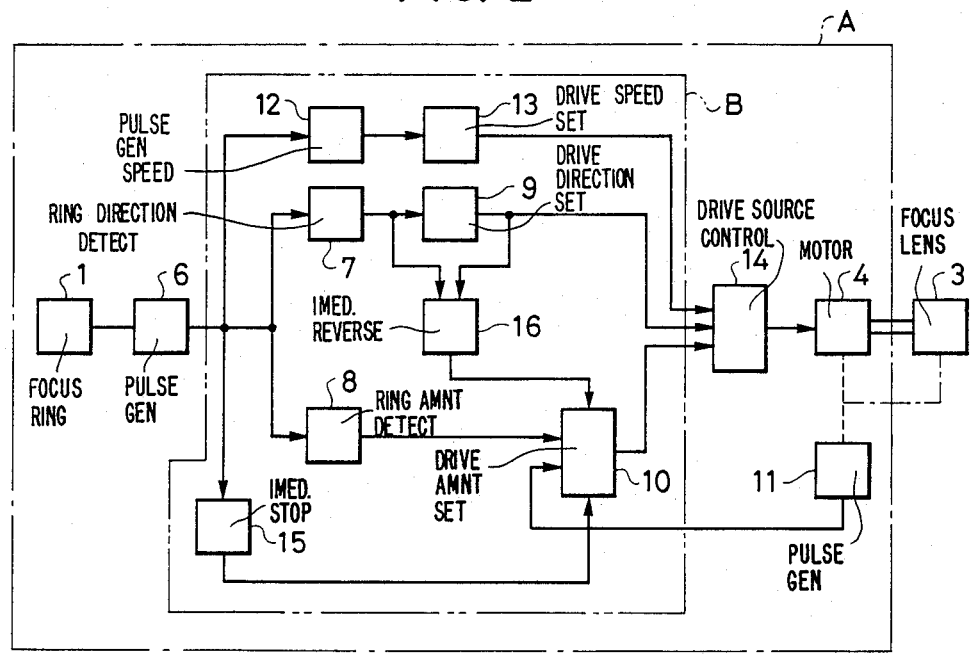
FIG. 2 is a block diagram showing the construction of a control system in an embodiment of the power focus device of the present invention.
Figure 3:
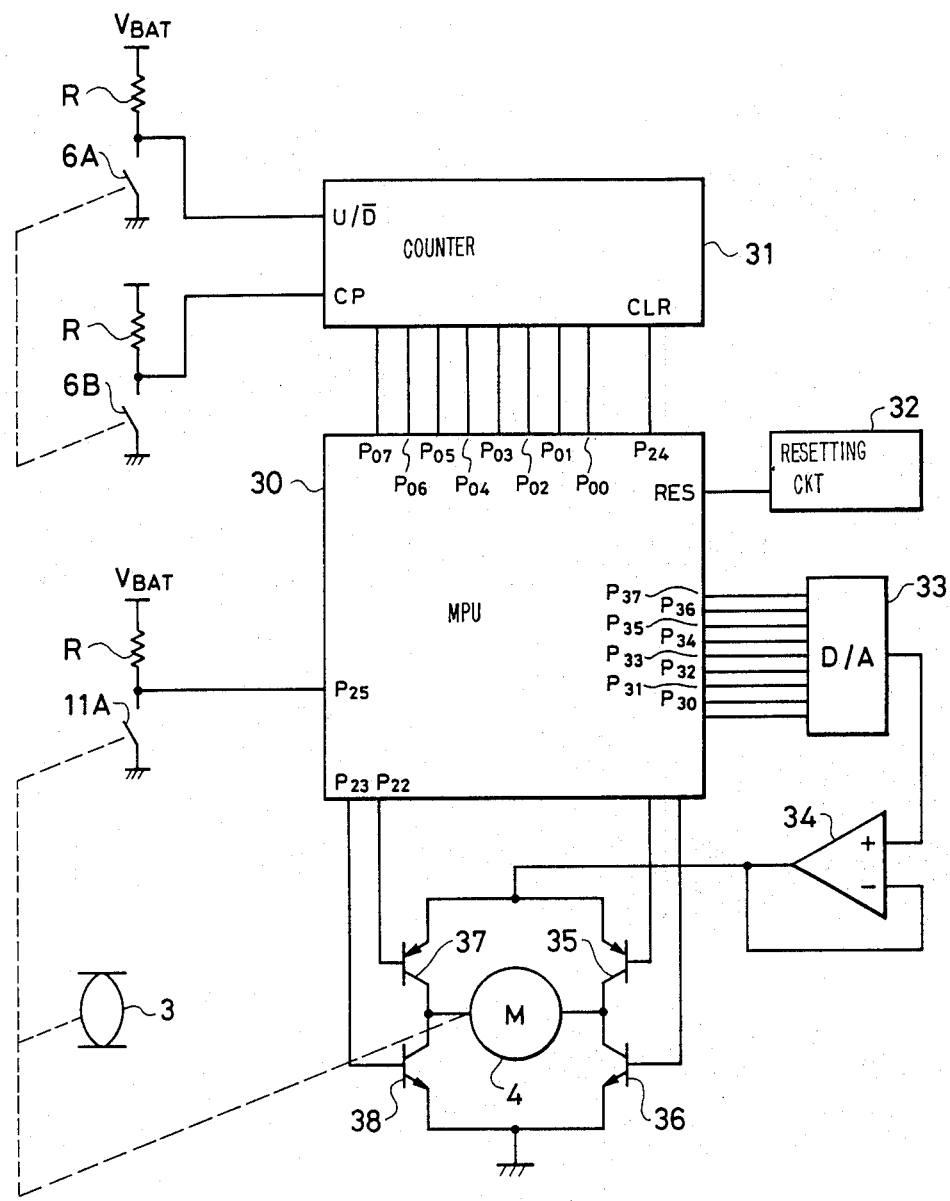
FIG. 3 shows an example of the actual electrical construction of the embodiment shown in FIG. 2.

FIG. 2 shows the functions of essential portions in an embodiment of the power focus device of the present invention as a block diagram of the control system, and FIG. 3 shows the actual electrical construction of the power focus device shown in FIG. 2.

In FIG. 2, reference numeral 1 designates the focus ring rotatively operated by fingers, reference numeral 6 denotes first pulse generating means operatively associated with the focus ring 1 to generate a pulse signal, reference numeral 3 designates a focusing lens provided in the lens barrel of a camera or the like, and reference numeral 4 denotes a drive source such as a motor for driving the lens 3. Reference numeral 7 designates focus ring rotation direction detecting means for detecting the direction of rotation of the focus ring 1 by the pulse signal generated from the first pulse generating means 6, reference numeral 8 denotes focus ring rotation amount detecting means for detecting the amount of rotation (the angle of rotation) of the focus ring 1 from said pulse signal, and reference numeral 9 designates drive direction setting means for setting the direction of rotation detected by the focus ring rotation direction detecting means 7 as the direction of drive (the direction of rotation) of the drive source 4. Reference numeral 10 denotes drive amount setting means for setting the amount of drive (the angle of rotation) corresponding to the amount of rotation detected by the focus ring rotation amount detecting means 8 as the amount of drive of the drive source 4, reference numeral 11 designates second pulse generating means for generating a pulse signal proportional to the movement of the drive source 4 or the lens 3, and reference numeral 12 denotes pulse generation speed detecting means for detecting the generation speed of the pulse signal generated from the first pulse generating means 6. Reference numeral 13 designates drive speed setting means for setting the drive speed of the drive source 4 in conformity with the pulse speed detected in the pulse generation speed detecting means 12, and reference numeral 14 denotes drive source control means for controlling a current or a voltage applied to the drive source 4 and the pulse period or the like in accordance with the set values set in the drive direction setting means 7, the drive amount setting means 8 and the drive speed setting means 13. Reference numeral 15 designates immediate stopping means for generating a signal for resetting the drive amount setting means 10 to render the set value thereof into zero and stopping the drive source 4 when no pulse signal is generated from the pulse generating means 6 even after a predetermined time has elapsed, and reference numeral 16 denotes immediate reversing means for generating a signal for resetting the set value in the drive amount setting means 10 to zero and driving the drive source 4 in a reverse direction when the direction of drive detected in the drive direction detecting means 7 changes.

In the drive amount setting means 10, the set value is successively subtracted by the pulse number generated from the second pulse generating means 11, and when the set value has become zero, the drive source 4 is stopped by the drive source control means 14.

The setting of the amount of drive in the drive amount setting means 10 is effected in conformity with the detected value of the focus ring rotation amount detecting means 8, but this setting of the amount of drive is reset by the output of the immediate stopping means 15 and the output of the immediate reversing means 16, and the drive source 4 is immediately stopped or reversed.

The immediate reversing means 16 has the function of rendering the set value of the amount of drive in the drive amount setting means 10 into zero (that is, temporarily stopping the drive source 4) only when the detected value in the focus ring rotation direction detecting means 7 and the set value in the drive direction setting means 9 differ from each other within a predetermined time.

In FIG. 2, a block A encircled by a dot-and-dash line is a portion corresponding to the power focus device 100 shown in FIG. 1, and this block A includes a construction corresponding to the manual focus operation circuit 2 and the drive control circuit 5 shown in FIG. 1. In FIG. 2, the dotted line, the dot-and-dash line and the double solid line indicate mechanical connections.

FIG. 3 shows an example of the actual electrical construction for realizing the control system shown in FIG. 2. In FIG. 3, reference numeral 30 designates an MPU (microprocessor unit), reference numeral 31 denotes a counter, reference numeral 32 designates a resetting circuit, reference numeral 33 denotes a D/A converter, reference numeral 34 designates a voltage follower, reference numerals 35-38 denote transistors for changing over the current to the drive source 4 (i.e., the motor), reference character 11A designates a pulse generating switch constituting the second pulse generating means 11 shown in FIG. 2, and reference characters 6A and 6B denote two pulse generating switches constituting the first pulse generating means 6 also shown in FIG. 2. In FIG. 3, Letters R designate resistors, and dotted lines indicate mechanical connections.

In FIG. 2, the function of a block B encircled by a dots-and-dash line is realized by a construction comprising the MPU 30, the counter 31 and the resetting circuit 32. On the other hand, the functions corresponding to the drive source control means 14 of FIG. 2 and the drive control circuit 5 of FIG. 1 are realized by a construction comprising a part of the MPU 30 and the D/A converter 33 and a construction comprising the voltage follower 34 and the transistors 35-38.

Figure 4:
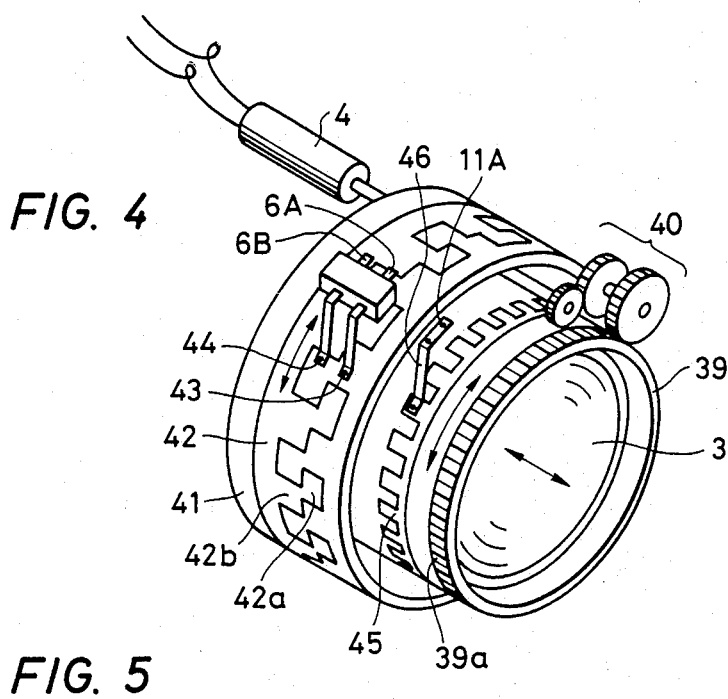
FIG. 4 is a perspective view showing an example of pulse generating means and an example of a lens driving mechanism associated with a focus ring and a first helicoid cylinder in the embodiment shown in FIGS. 2 and 3.
Figure 5:
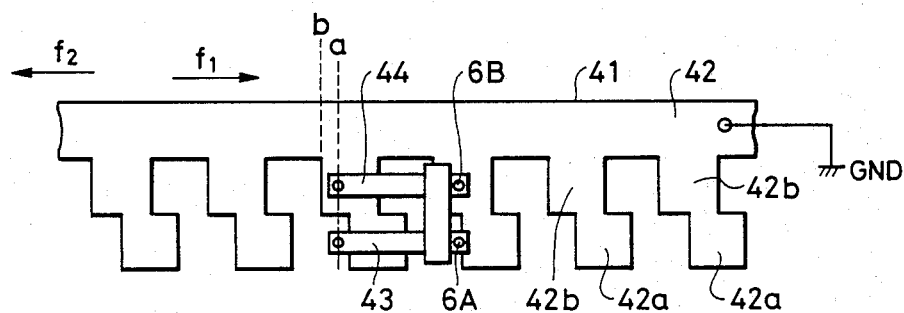
FIG. 5 is a plan view of one of the pulse generating means shown in FIG. 4.

FIGS. 4 and 5 show an embodiment of the pulse generating switches 6A and 6B and pulse generating switch 11A shown in FIG. 3.

In FIG. 4, reference numeral 39 designates a first helicoid cylinder of the lens barrel of a camera (or the barrel of an interchangeable lens). The first helicoid cylinder 39 is supported on the lens barrel body or the like only for rotation thereon. A lens 3 mounted to an unshown second helicoid cylinder (supported for rotation and movement in the direction of the optic axis relative to the lens barrel body) is contained in the inner diameter position of the first helicoid cylinder 39, and the threadable engagement between the first helicoid cylinder 39 and the second helicoid cylinder enables the lens 3 to be moved along the direction of the optic axis relative to the first helicoid cylinder 39 to thereby accomplish in-focus adjustment when the first helicoid cylinder 39 is rotated. Teeth 39a are formed on the outer peripheral surface of the first helicoid cylinder 39, and the first helicoid cylinder itself is constructed as a ring gear. A gear train 40 meshing with the teeth 39a of the first helicoid cylinder 39 to rotate the first helicoid cylinder 39 is disposed outside the first helicoid cylinder 39, and rotation is transmitted to this gear train 40 from the drive source 4 disposed outside the first helicoid cylinder 39.

The focus ring 1 shown in FIG. 1 is fitted for rotation relative to the lens barrel body (the outer diameter side of the first helicoid cylinder), and a ring 41 rotatable with the focus ring 1 is fitted on the first helicoid cylinder 39. A conductor pattern 42 is formed on the outer peripheral surface of the ring 41 as shown in FIGS. 4 and 5, and this conductor pattern 42 is grounded as shown in FIG. 5. Two pattern portions 42a and 42b arranged with deviation of one-half pitch along the circumferential direction of the ring 41 are formed on the conductor pattern 42. The slidable contact pieces 43 and 44 of the two pulse generating switches 6A and 6B supported stationarily by an unshown support member (the fixed cylinder of the lens barrel body) are disposed outside the outer peripheral surface of the ring 41, the contact piece 43 of the pulse generating switch 6A being positioned at a position whereat it contacts the pattern portion 42a, and the contact piece 44 of the pulse generating switch 6B being positioned at a position whereat it contacts the pattern portion 42b.

Figure 6:
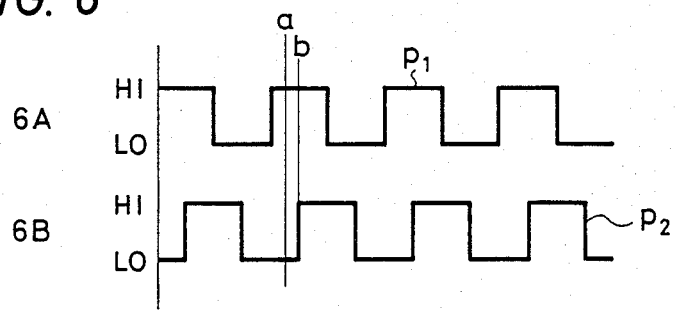
FIG. 6 shows the phases and waveforms of pulse signals generated in the pulse generating means shown in FIG. 5.

Thus, when the ring 41 is rotated in the direction of arrow $f_1$ in FIG. 5, pulse signals which are one-half pitch out of phase with each other as shown in FIG. 6 are generated in the circuit connected to the two contact pieces 43 and 44. In FIGS. 5 and 6, when the contact pieces 43 and 44 are on the line a of FIG. 5, the voltages of pulse signals P1 and P2 generated in the pulse generating switches 6A and 6B assume the values on the line a of FIG. 6, and when the contact pieces 43 and 44 are on the line b of FIG. 5, the voltages of the pulse signals generated in the pulse generating switches 6A and 6B assume the values on the line b of FIG. 6.

Since the pulse signals P1 and P2 have a phase difference of one-half pitch therebetween, the direction of rotation of the ring 41 can be detected by comparing the pulse numbers or the phases of the two pulse signals within a predetermined time. On the other hand, a conductor pattern 45 comprising only one kind of pattern portion as shown in FIG. 4 is formed on the outer peripheral surface of the first helicoid cylinder 39, and this conductor pattern 45 is also grounded like the aforementioned conductor pattern 42. The pulse generating switch 11A having a contact piece 46 contacting this conductor pattern 45 is provided outside the first helicoid cylinder 39. Only one kind of pulse signal is generated from this pulse generating switch 11A and therefore, this pulse signal is representative of the amount of rotation of the first helicoid cylinder 39 (i.e., the amount of movement of the lens 3), but the direction of rotation thereof cannot be detected from this pulse signal.

Operation of the power focus device according to the present embodiment will now be described with reference chiefly to FIG. 2.

Let it be assumed that the photographer has first rotatively operated the focus ring 1 in a first direction by his fingers, whereby the ring 41 (see FIG. 4) integral with the focus ring 1 has been rotated, for example, in the direction of arrow $f_1$ of FIG. 5. As a result, two pulse signals P1 and P2 differing from each other in phase as shown in FIG. 6 are generated from the two pulse generating switches 6A and 6B (FIG. 4) constituting the first pulse generating means 6 (FIG. 2). These pulse signals are applied to the focus ring rotation direction detecting means 7, the focus ring rotation amount detecting means 8 and the pulse generation speed detecting means 12 and simultaneously therewith, are also applied to the immediate stopping means 15. As a result, in the focus ring rotation direction detecting means 7, the direction of rotation of the focus ring 1 is detected from the comparison between the pulse numbers of two pulse signals P1 and P2, and in the focus ring rotation amount detecting means 8, the amount of rotation of the focus ring 1 is detected.

On the other hand, in the pulse generation speed detecting means 12, the speed of rotation of the focus ring 1 is detected.

The pulse signals are also applied to the immediate stopping means 15 having a timer circuit and therefore, operation of the timer circuit in the immediate stopping means 15 is started.

The focus ring rotation direction detecting means 7, the focus ring rotation amount detecting means 8, the pulse generation speed detecting means 12, the immediate stopping means 15, etc. are all constituted by various registers and timers in the MPU 30 and the counter 31.

When the direction of rotation of the focus ring, the value of the amount of rotation of the focus ring and the value of the pulse generation speed are detected from the pulse signals generated by the rotative operation of the focus ring 1 as previously described, the direction of drive of the drive source 4 and the amount of drive of the drive source 4 are set in the drive direction setting means 9 and the drive amount setting means 10, respectively, and the speed of drive of the drive source 4 is set in the drive speed setting means 13. Signals representative of these set values are applied to the drive source control means 14, which thus drives the drive source 4 on the basis of these set values.

On the other hand, when the direction of rotation of the focus ring 1 is detected by the focus ring rotation direction detecting means 7, an input corresponding to said direction of rotation also enters the immediate reversing means 16 by the output of the detecting means 7. In this case, the same direction as the detected direction in the detecting means 7 is also set in the drive direction setting means 9 by the detecting means 7 and therefore, an output for rendering the set value in the drive amount setting means 10 into zero is not produced from the immediate reversing means 16 to which are applied the output of the drive direction setting means 9 and the output of the detecting means 7.

When the drive source 4 is driven, the rotation of the drive source 4 is decelerated and transmitted to the first helicoid cylinder 39 through the gear train 40 in FIG. 4, whereby the first helicoid cylinder 39 is rotated. When the first helicoid cylinder 39 is rotated, the second helicoid cylinder (not shown) which is in threadable engagement with the first helicoid cylinder 39 is moved axially thereof and the lens 3 is moved, for example, toward the fore end side of the first helicoid cylinder 39. Also, when the first helicoid cylinder 39 is rotated, the conductor pattern 45 formed on the outer peripheral surface of the first helicoid cylinder 39 is moved circumferentially and therefore, a pulse signal representative of the amount of rotation of the first helicoid cylinder 39 (i.e., the amount of movement of the lens 3) is generated in the pulse generating switch 11A having the contact piece 46 which contacts the conductor pattern 45, and this pulse signal is fed back to the drive amount setting means 10. The drive amount setting means 10 subtracts the initially set value (i.e., the initially set drive amount based on the detected value detected by the focus ring rotation amount detecting means 8) by the drive amount detection signal fed back from the second pulse generating means 11 as described above, and stops the drive source 4 by the drive source control means 14 when the initially set value has become zero.

When the focus ring 1 is first rotatively operated in a forward direction and then rotatively operated in a reverse direction, the phases of the pulse signals P1 and P2 generated from the pulse generating switches 6A and 6B are also reversed, and in the focus ring rotation direction detecting means 7, an output signal of +1, for example, is generated as the direction of rotation during the forward rotation of the focus ring 1 and subsequently, an output signal of −1, for example, in generated in conformity with the reverse rotation of the focus ring 1. Therefore, an input signal of −1 enters the immediate reversing means 16 from the focus ring rotation direction detecting means 7, and in the previous operation of the focus ring, an input signal of +1 has entered the immediate reversing means 16 from the drive direction setting means 9 and thus, a signal for rendering the set amount in the drive amount setting means 10 into zero is output from the immediate reversing means 16. As a result, the set amount in the drive amount setting means 10 becomes zero and the driving of the drive source 4 is immediately stopped by the drive source control means 14, whereafter driving is immediately started on the basis of the newly set direction of drive and amount of drive and the drive source 4 is reversed in rotation.

On the other hand, the first pulse signal resulting from the rotative operation of the focus ring 1 is generated from the pulse generating means 6 and if the succeeding pulse is not generated even when a predetermined time has elapsed from the time of the first pulse generation while the drive source 4 and the lens 3 are driven in response to said pulse signal, the time of the timer circuit in the immediate stopping means 15 is up and a signal for rendering the set value of the drive amount setting means 10 into zero is generated from said means 15, whereby the set value of the drive amount setting means 10 is rendered into zero and the drive source 4 is immediately stopped. Therefore, the drive source 4 does not rotate for a relatively long time after the rotative operation of the focus ring has been stopped and thus, the drive source 4 immediately follows the operation of the focus ring 1.

Figure 7:
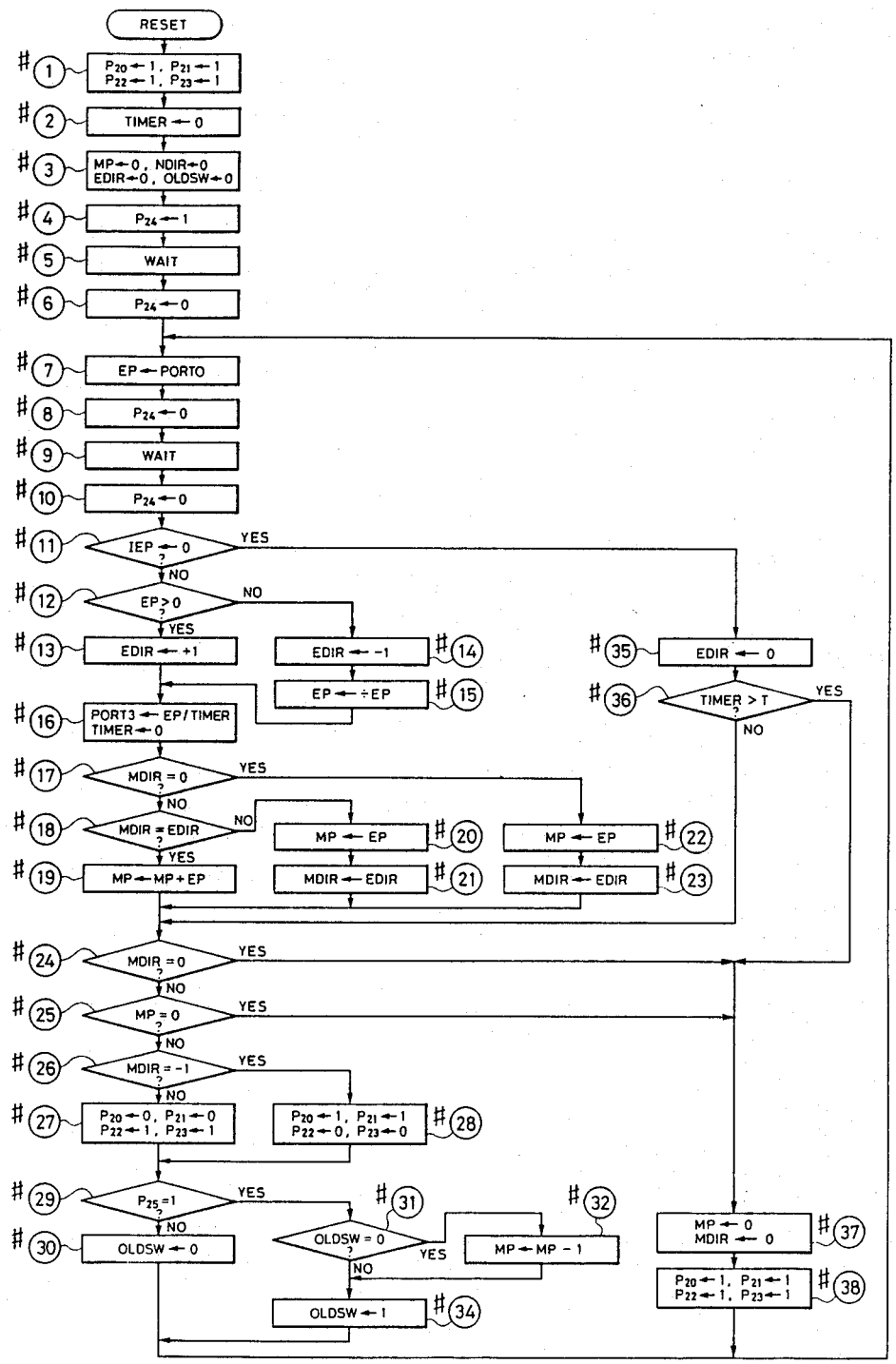
FIG. 7 is a flow chart for explaining the operation of the MPU 30 of FIG. 3.

FIG. 7 is a flow chart of the program for operating the MPU 30 in the actual device shown in FIG. 3.

Operation of the device of FIG. 3 will hereinafter be described with reference to FIGS. 3 and 7.

When power is supplied from a power source, not shown, the resetting circuit 32 outputs a low level for a predetermined period of time and resets the MPU 30. Thereafter, the resetting circuit rises to a high level and the MPU 30 begins to execute the program in succession from step (1).

Step (1) 1 (high level) is output from an output port P20 to P23. Thereby the transistors 37 and 35 are turned off and the transistors 38 and 36 are turned on, and the opposite ends of the motor 4 are dropped to the gland and a power generation brake is applied.

Step (2) 0 is set in the timer TIMER in the MPU. The timer TIMER has the function of incrementing the value by 1 for each predetermined time.

Step (3) Registers MP, MDIR, EDIR and ODSW are cleared. MP, EP, MDIR, EDIR and OLDSW are registers in the MPU 1.

Step (4) 1 is output to a port P24 and the value of the counter 31 is cleared.

Step (5) Timing is debayed while the value of the counter 31 is reset.

Step (6) 0 is output to the port P24 and the counter 31 is returned to a condition in which it is capable of counting.

Step (7) The content of the counter 31 is read in from a port PORT 0 and stored into a register EP. As long as the focus ring is not rotated, the switches 6A and 6B do not change and therefore, the value of the counter 31 remains cleared at step (4) and thus, EP becomes 0. At steps (8)–(10), as at steps (4)–(6), the value of the counter 31 is cleared.

Step (11) Whether EP=0 is determined. Now EP=0 and therefore, the program branches off to step (35).

Step (35) 0 is entered into the focus ring rotation direction register EDIR.

Step (24) The value of the motor rotation direction register MDIR is determined, and at step (3), it is cleared to 0 and therefore, the program branches off to step (37).

Step (37) The registers MDIR and MP are cleared.

Step (38) As at step (1), brakes are applied to the motor 4. Thereafter, the program returns to step (7). Accordingly, steps (7)-(8)-(9)-(10)-(11)-(35)-(36)-(24)-(37)-(38) are repetitively executed as long as the focus ring is not rotated. In the mean time, the motor 4 holds its braked state.

Now, when the focus ring is rotated in this state, the switches 6A and 6B are closed and opened and the signals P1 and P2 as shown in FIG. 6 are generated, and since the signals P1 and P2 assume a high level each time the switches 6A and 6B are closed, the value of the counter 31 is incremented. Accordingly, the value of EP input at step (7) becomes positive. Once the value of the counter 31 is read in, it is reset at steps (8) to (10) and therefore, it is never dually read in. At step (11), whether EP=0 is determined and, since EP is not equal to 0, the program branches off to step (12).

Step (12) Whether EP >0 is determined and the program branches off to step (13).

Step (13) +1 is stored in the focus ring rotation direction register EDIR.

Step (16) EP/TIMER is output from an output port 3 to the D/A converter 33. That is, a voltage proportional to the amount of pulse per unit time divided by the time required to vary the pulse of the focus ring appears at the output of the voltage follower 34.

Step (17) The value of the register MDIR is determined and since it is cleared at step (3), the program branches off to step (22).

Step (22) The value of EP is in the motor movement amount register MP.

Step (23) The value of EDIR is stored in the motor rotation direction register MDIR.

Step (24) The value of MDIR is determined and since it is not 0, the program branches off to step (25).

Step (25) The value of MP is determined, and since it is not 0, the program proceeds to step (26).

Step (26) The value of MDIR is determined and since it is +1, the program proceeds to step (27).

Step (27) 0 is output to P20 and P21, 1 is output to P22 and P23, the transistors 38 and 35 are turned on and the transistors 37 and 36 are turned off, whereby a current flows from the voltage follower 34 to the transistor 35, the motor 4 and the transistor 38 to drive the motor 4 and move the photo-taking lens 3 toward the infinity end.

Step (29) The state of the switch 11A is determined and if it is in its ON state, the program proceeds to step (30).

Step (30) The register OLDSW is set to 0 and the program returns to step (7). If the focus ring remains unrotated, the counter 31 remains 0, and the loop of steps (7)-(8)-(9)-(10)-(11)-(35)-(36)-(24)-(25)-(26)-(27)-(29)-(30) is repeated. In the meantime, the photo-taking lens 3 is moved to a desired position by the drive of the motor 4, and the switch 11A becomes opened, and at step (29), the program branches off to step (31).

Step (31) The state of the register OLDSW is determined. At step (30), it is set to 0 and therefore, the program proceeds to step (32).

Step (32) The value of MP is decremented.

Step (33) 1 is set in OLDSW. Thereafter, at the branch-off of step (31), the program does not go to step (32), but goes to step (33). The loop of steps (7)-(8)-(9)-(10)-(11)-(35)-(36)-(24)-(25)-(26)-(27)-(31)-(34) is repeated while the switch 11A is in its OFF state. Thus, in the routine of steps (29) to (34), the value of the register MP is subtracted by 1 each time the switch 11A rises from its ON state to its OFF state.

While the above-described loop is being executed, soon MP=0 and at step (25), the program branches off to step (37) and the brakes are applied to the motor 4. In this manner, the photo-taking lens 3 can be electrically driven by an amount equal to the rotational pulse of the focus ring.

A description will now be given for a case where the focus ring continues to be rotated when the motor is being driven.

The aforedescribed loop of steps (7)-(8)-(9)-(10)-(11)-(12)-(13)-(16)-(17)-(22)-(23)-(24)-(27)-(29)-(30) remain unchanged until there occurs a change from the braked state to the power-supplied state, but the focus ring is still rotated when the value of the counter 31 is read for the second time and therefore, a positive value is set in EP. Steps (12)-(13)-(16) are controlled in the same manner as in the previous case, and at step (17), the program branches off to step (18).

Step (18) The values of the focus ring rotation direction register EDIR and the motor rotation direction register MDIR are compared, and if they are in the same direction, the program branches off to step (19).

Step (19) An amount corresponding to the newly increased pulse EP is added to the motor movement pulse register MP.

Thereafter, control is effected in the same manner as the aforedescribed control and therefore, the photo-taking lens can be moved in conformity with the amount of rotation of the focus ring which has continued to be moved. Also, when the focus ring is reversely rotated, the value of the counter 31 becomes negative and therefore, at step (12), the program branches off to step (14).

Step (14) −1 is set in the focus ring rotation direction register EDIR to indicate that the direction of rotation is reverse.

Step (15) The value of EP is corrected to an absolute value. Thereafter, the control of steps (16) to (25) is effected just in the same way as during the forward rotation. At step (26), MDIR is set to −1 and therefore, the program proceeds to step (28).

Step (28) 1 is output to ports P20 and P21 and 0 is output to ports P22 and P23. Accordingly, a current flows from the voltage follower 34 to the transistor 37, the motor 4 and the transistor 36 to move the photo-taking lens 3 toward the close distance end. Thereafter, control in the reverse direction can also be accomplished in just the same way.

A description will now be given of a case where the focus ring is rotated in the reverse direction when the motor 4 is being driven. When the focus ring is rotated in the reverse direction, great unnaturalness will be felt if the motor 4 does not follow in the driving direction. When the focus ring is rotated in the reverse direction, the value of the counter 31 and the sign of EP are reversed. Accordingly, at step (18), the values of the registers MDIR and EDIR become unequal and the program branches off to step (20).

Step (20) The value of the lens movement amount register MP is discarded and rendered into the value of EP.

Step (21) The direction of rotation of the motor 4 is changed to a new direction. In this manner, the rotation of the motor 4 can also be reversed in response to the reversal of the focus ring. Also, unnaturalness will be felt when the motor continues to move for a while even if the rotation of the focus ring is stopped. Accordingly, if the value of the counter 31 remains to be 0 for a predetermined time T after the timer TIMER has been set to 0 at step (2) or (16), it is judged as timed-out at step (36), and the program branches off to step (37) and by applying the brakes to the motor 4, the sense can be made approximate to the manual focusing.

In the above-described embodiment, the first pulse generating means for generating a pulse signal in response to the rotative operation of the focus ring and the second pulse generating means for generating a pulse signal in response to the rotation of the first helicoid cylinder are constructed as sliding contact type switch means, but as a matter of course, these pulse generating means may be constituted by a noncontact type converter such as a photoelectric type converter, a magneto-responsive type converter or an electrostatic capacity type converter. As the drive source 4, use may be made for not only a conventional electric motor, but also various actuators whose rotation or movement can be electrically controlled.

In the power focus device shown in the above-described embodiment, (A) a focus ring of the same rotative operation type as the conventional manual focus device is used as the manual focus operating member and this leads to ease of use, (B) the lens drive source immediately follows the reverse rotation or the stopped operation of the focus ring, (C) the rotation of the focus ring is converted into a pulse signal and operation is effected by a digital signal to thereby control the lens drive source, and this leads to the possibility of accomplishing highly accurate control, (D) the lens drive is effected at a speed conforming to the speed of rotation of the focus ring and therefore, focus adjustment matching the photographer's intention can be accomplished, and (E) whether the lens drive is properly effected on the basis of the amount of rotation of the focus ring is checked up and therefore, highly accurate control can be accomplished.

We claim:

1. A power focus device in a camera comprising:
 (a) a manually rotatively operated focus ring;
 (b) a lens driving source for driving a focusing lens;
 (c) pulse generating means operatively associated with the rotation of said focus ring to generate a pulse signal conforming to the amount of rotation of said focus ring;
 (d) focus ring rotation direction detecting means for detecting the direction of rotation of said focus ring from said pulse signal;
 (e) focus ring rotation amount detecting means for detecting the amount of rotation of said focus ring from said pulse signal;
 (f) drive direction setting means for setting the direction of drive of said lens driving drive source on the basis of the result of the direction in said focus ring rotation direction detecting means;
 (g) drive amount setting means for memorizing the result of the direction in said focus ring rotation amount detecting means and setting the memorized value as the amount of drive of said lens driving drive source;
 (h) drive source control means for controlling said lens driving drive source in accordance with the direction of drive set in said drive direction setting means and the amount of drive set in said drive amount setting means; and
 (i) reversing means for immediately reversing said lens driving drive source, said reversing means changing the setting in said drive direction setting means and returning said drive amount setting means to its initial state by resetting the memorized value and immediately reversing said lens driving drive source when said focus ring has been rotatively operated in a direction to drive said lens driving drive source in a second direction when said lens driving drive source is being driven in a first direction.

2. A device according to claim 1, wherein said focus ring is rotatably supported on a photo-taking lens barrel.

3. A device according to claim 2, wherein a motor is used as said lens driving drive source, and said motor is contained in said photo-taking lens barrel.

4. A device according to claim 2, wherein said pulse generating means has a pattern group formed about the optic axis and a sliding brush for slidably contacting said pattern group, one of said pattern group and said sliding brush is adapted to be rotated in response to the rotation of said focus ring to thereby generate a pulse signal, said pattern group has at least two kinds of patterns differing in phase from each other, and a different signal is obtained in conformity with the change-over of the direction of rotation of said focus ring.

5. A power focus device in a camera comprising:
 (a) a manually rotatively operated focus ring;
 (b) a lens driving drive source for driving a focusing lens;
 (c) pulse generating means operatively associated with the rotation of said focus ring to generate a pulse signal conforming to the amount of rotation of said focus ring;
 (d) focus ring rotation direction detecting means for detecting the direction of rotation of said focus ring from said pulse signal;
 (e) focus ring rotation amount detecting means for detecting the amount of rotation of said focus ring from said pulse signal;
 (f) drive direction setting means for setting the direction of drive of said lens driving drive source on the basis of the result of the detection in said focus ring rotation direction detecting means;

(g) drive amount setting means for memorizing the result of the detection in said focus ring rotation amount detecting means and setting the memorized value as the amount of drive of said lens driving drive source;

(h) detecting means for converting the driven state of said focusing lens into a signal representative of movement and outputting the signal; and (i) drive source control means for controlling said lens driving drive source in accordance with the direction of drive set in said drive direction setting means and the amount of drive set in said drive amount setting means, said drive source control means being effective to stop said lens driving drive source at a point of time whereat said signal output from said detecting means corresponds to said set amount of drive.

6. A device according to claim 5, wherein said focus ring is rotatably supported on a photo-taking lens barrel.

7. A device according to claim 6, wherein a motor is used as said lens driving drive source, and said motor is contained in said photo-taking lens barrel.

8. A device according to claim 6, wherein said pulse generating means has a pattern group formed about the optic axis and a sliding brush for slidably contacting said pattern group, one of said pattern group and said sliding brush is adapted to be rotated in response to the rotation of said focus ring to thereby generate a pulse signal, said pattern group has at least two kinds of patterns differing in phase from each other, and a different signal is obtained in conformity with the change-over of the direction of rotation of said focus ring 9. A device according to claim 5, wherein said detecting means detects the movement of a moving member in a transmitting system from said lens driving drive source to said focusing lens and outputs a signal representative of the movement of said focusing lens in the direction of the optic axis thereof.

10. A device according to claim 9, wherein said moving member in said transmitting system is formed with a plurality of patterns, a sliding brush for slidably contacting said patterns is disposed, a pulse signal is generated by said sliding brush slidably contacting said patterns, and said pulse signal is used as a signal representative of the movement of said focusing lens in the direction o the optic axis thereof.

11. A power focus device in a camera comprising:
(a) a manually rotatively operated focus ring;
(b) a lens driving drive source for driving a focusing lens;
(c) pulse generating means operatively associated with the rotation of said focus ring to generate a pulse signal conforming to the amount of rotation of said focus ring;
(d) focus ring rotation direction detecting means for detecting the direction of rotation of said focus ring from said pulse signal;
(e) focus ring rotation amount detecting means for detecting the amount of rotation of said focus ring from said pulse signal;
(f) focus ring rotation speed detecting means for detecting the speed of rotation of said focus ring by a generation interval said pulse signal;
(g) drive speed setting means for setting the speed of drive of said lens driving drive source on the basis of the result of the detection in said focus ring rotation speed detecting means;
(h) drive direction setting means for setting the direction of drive of said lens driving drive source on the basis of the result of the detection in said focus ring rotation direction detecting means;
(i) drive amount setting means for memorizing the result of the detection in said focus ring rotation amount detecting means and setting the memorized value as the amount of drive of said lens driving drive source; and
(j) drive source control means for controlling said lens driving drive source in accordance with the speed of drive set in said drive speed setting means, the direction of drive set in said drive direction setting means and the amount of drive set in said drive amount setting means.

12. A device according to claim 11, wherein said focus ring is rotatably supported on a photo-taking lens barrel.

13. A device according to claim 12, wherein a motor is used as said lens driving drive source, and said motor is contained in said photo-taking lens barrel.

14. A device according to claim 11, wherein said drive speed setting means sets the speed of drive of said lens driving drive source to a faster speed as the speed of rotation of said focus ring is faster.

15. A power focus device in a camera comprising:
(a) a manually rotatively operated focus ring;
(b) a lens driving drive source for driving a focusing lens;
(c) pulse generating means operatively associated with the rotation of said focus ring to generate a pulse signal conforming to the amount of rotation of said focus ring;
(d) focus ring rotation direction detecting means for detecting the direction of rotation of said focus ring from said pulse signal;
(e) focus ring rotation amount detecting means for detecting the amount of rotation of said focus ring from said pulse signal;
(f) drive direction setting means for setting the direction of drive of said lens driving drive source on the basis of the result of the detection in said focus ring rotation direction detecting means;
(g) drive amount setting means for memorizing the result of the detection in said focus ring rotation amount detecting means and setting the memorized value as the amount of drive of said lens driving drive source;
(h) drive source control means for controlling said lens driving drive source in accordance with the direction of drive set in said drive direction setting means and the amount of drive set in said drive amount setting means; and
(i) forcible stopping means for stopping said lens driving drive source when the operation of said focus ring is stopped during the driving of said lens driving drive source, said forcible stopping means being effective to detect the time when said pulse signal is not generated and to judge that the operation of said focus ring has been stopped when it detects that said pulse signal is not generated for more than a set time.

16. A device according to claim 15, wherein said focus ring is rotatably supported on a photo-taking lens barrel.

17. A device according to claim 16, wherein a motor is used as said lens driving drive source, and said motor is contained in said photo-taking lens barrel.

18. A power focus device for a camera, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
a drive direction setting circuit for setting the direction of drive of said drive source on the basis of the result of the detection by said first detecting means;
a drive amount setting circuit for memorizing the result of the detection by said second detecting means and setting the memorized value as the amount of drive of said drive source;
a control circuit for controlling said drive source in accordance with the direction of drive set in said drive direction setting circuit and the amount of drive set in said drive amount setting circuit; and
a reversing circuit for immediately reversing said drive source, said reversing circuit changing the setting in said drive direction setting circuit and returning said drive amount setting circuit to its initial state and immediately reversing said drive source when said focus ring has been rotated in a reverse direction.

19. A device according to claim 18, wherein said drive source comprises a motor, and wherein said pulse generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

20. A device according to claim 19, wherein said detecting member in said pulse generating means and said detecting member in said first detecting means are arranged as a common structure.

21. An interchangeable lens, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring from said pulse signal;
a drive direction setting circuit for setting the direction of drive of said drive source on the basis of the result of the detection in said second detecting means and setting the memorized value as the amount of drive of said drive source;
a control circuit for controlling said drive source in accordance with the direction of drive set in said drive direction setting circuit and the amount of drive set in said drive amount.setting circuit; and
a reversing circuit for immediately reversing said drive source, said reversing circuit changing the setting in said drive direction setting circuit and returning said drive amount setting circuit to its initial state and immediately reversing said drive source when said focus ring has been rotated in a reverse direction.

22. A lens according to claim 21, wherein said drive source comprises a motor, and wherein said pulse generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

23. A lens according to claim 22, wherein said detecting member in said pulse generating means and said detecting member in said first detecting means are arranged as a common structure.

24. A power focus device for a camera, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
a drive direction setting circuit for setting the direction of drive of said drive source on the basis of the result of the detection by said first detecting means;
a drive amount setting circuit for memorizing the result of the detection by said second detecting means and setting the memorized value as the amount of drive of said drive source; and
a control circuit for controlling said drive source in accordance with the direction of drive set in said drive direction setting circuit and the amount of drive set in said drive amount setting circuit, said control circuit being effective to stop said drive source at a point of time corresponding to said set amount of drive.

25. A device according to claim 24, wherein said drive source comprises a motor, and wherein said pulse generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

26. A device according to claim 25, wherein said detecting member in said pulse generating means and said detecting member in said first detecting means are arranged as a common structure.

27. An interchangeable lens, comprising:
a manually operated rotating focus ring;
a drive source for driving a focusing lens;
pulse generating means operatively associated with the rotation of said focus ring to generate a pulse signal conforming to the amount of rotation of said focus ring;

first detecting means for detecting the direction of rotation of said focus ring;

second detecting means for detecting the amount of rotation of said focus ring from said pulse signal;

a drive direction setting circuit for setting the direction of drive of said drive source on the basis of the result of the detection by said first detecting means;

a drive setting circuit for memorizing the result of the direction by said second detecting means and setting the memorized value as the amount of drive of said drive source; and a control circuit for controlling said drive source in accordance with the direction of drive set in said drive direction setting circuit and the amount of drive set in said drive amount setting circuit, said control circuit being effective to stop said drive source at a point of time corresponding to said set amount of drive.

28. A lens according to claim 27, wherein said drive source comprises a motor, an wherein said pulse generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

29. A lens according to claim 28, wherein said detecting member in said pulse generating means and said detecting member in said first detecting means are arranged as a common structure.

30. A power focus device for a camera, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
speed detecting means for detecting the speed of rotation of said focus ring;
drive speed setting means for setting the speed of drive of said drive source on the basis of the result of the detection by said speed detecting means;
drive direction setting means for setting the direction of drive of said drive source on the basis of the result of the detection by said first detecting means;
drive amount setting means for memorizing the result of the detection by said second detecting means and setting the memorized value as the amount of drive of said drive source; and
control means for controlling said drive source in accordance with the speed of drive set in said drive speed setting means, the direction of drive set in said drive direction setting means, and the amount of drive set in said drive amount setting means.

31. A device according to claim 30, wherein said drive source comprises a motor, and wherein said pulse generating means includes a detecting member which generates said pulse signal in response to the rotation of said focus ring, and wherein said first detecting means has a detecting member which generates a signal corresponding to the rotating direction of said focus ring, and wherein said second detecting means has a detecting circuit which detects the amount of rotation of said focus ring on the basis of the number of pulses of said pulse signal generated by said pulse generating means.

32. A device according to claim 31, wherein said detecting member in said pulse generating means and said detecting member in said first detecting means are arranged as a common structure.

33. A device according to claim 30, wherein said speed detecting means detects the rotation speed of said focus ring on the basis of said pulse signal.

34. A device according to claim 33, wherein said drive speed setting means detects the speed of rotation of said focus ring by a generation interval of said pulse signal.

35. A device according to claim 33, wherein said drive speed setting means sets the speed of drive of said drive source to a faster speed as the speed of rotation of said focus ring increases 36. An interchangeable lens, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
speed detecting means for detecting the speed of rotation of said focus ring;
drive speed setting means for setting the speed of drive of said drive source on the basis of the result of the detection by said speed detecting means;
drive direction setting means for setting the direction of drive of said drive source on the basis of the result of the detection by said first detecting means;
drive amount setting means for memorizing the result of the detection by said second detecting means and setting the memorized value as the amount of drive of said drive source; and
control means for controlling said drive source in accordance with the speed of drive set in said drive speed setting means, the direction of drive set in said drive direction setting means, and the amount of drive set in said drive amount setting means.

37. A lens according to claim 36, wherein said drive source comprises a motor, and wherein said pulse generating means includes a detecting member which generates said pulse signal in response to the rotation of said focus ring, and wherein said first detecting mans includes a detecting member which generates a signal corresponding to the rotating direction of said focus ring, and wherein said second detecting means has a detecting circuit which detects the amount of rotation of said focus ring on the basis of the amount of pulses of said pulse signal generated by said pulse generating means.

38. A lens according to claim 37, wherein said detecting member in said pulse generating means and said detecting member in said first detecting means are arranged as a common structure.

39. A lens according to claim 36, wherein said speed detecting means detects the rotation speed of said focus ring on the basis of said pulse signal.

40. A lens according to claim 39, wherein said drive speed setting means detects the speed of rotation of said focus ring by a generation interval of said pulse signal.

41. A lens according to claim 39, wherein said drive speed setting means sets the speed of drive of said drive source to a faster speed as the speed of rotation of said focus ring increases.

42. A power focus device for a camera, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
a drive direction setting circuit for setting the direction of drive of said drive source on the basis of the result of the detection performed in said first detecting means;
a drive amount setting circuit for memorizing the result of the detection performed in said second detecting means and setting the memorized value as the amount of drive of said drive source;
a control circuit for controlling said drive source in accordance with the direction of drive set in said drive direction setting circuit and the amount of drive set in said drive amount setting circuit; and
a stopping circuit for stopping said drive source when the operation of said focus ring is stopped during the driving of said drive source, said stopping circuit including a timer circuit to detect the time when said pulse signal is not generated, said stopping circuit detecting that the operation of said focus ring has been stopped when said timer circuit detects that said pulse signal is not generated for more than a predetermined period of time.

43. A device according to claim 42, wherein said drive source comprises a motor, and wherein said pulse generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

44. A device according to claim 43, wherein said detecting member in said pulse generating means and said detecting member in said first detecting means are arranged as a common structure.

45. An interchangeable lens, comprising:
a manually operated rotating focus ring;
a drive source for driving a focusing lens;
pulse generating means operatively associated with the rotation of said focus ring to generate a pulse signal conforming to the amount of rotation of said focus ring;
first detecting means for detecting the direction of rotation of said focus ring;
second detecting means for detecting the amount of rotation of said focus ring from said pulse signal;
a drive direction setting circuit for setting the direction of drive of said drive source on the basis of the result of the detection performed in said first detecting means;
a drive amount setting circuit for memorizing the result of the detection performed in said second detecting means and setting the memorized value as the amount of drive of said drive source;
a control circuit for controlling said drive source in accordance with the direction of drive set in said drive direction setting circuit and the amount of drive set in said drive amount setting circuit; and
a stopping circuit for stopping said drive source when the operation of said focus ring is stopped during the driving of said drive source, said stopping circuit including a timer circuit for detecting the time when said pulse signal is not generated, said stopping circuit detecting that the operation of said focus ring has been stopped when said timer circuit detects that said pulse signal is not generated for more than a predetermined period of time.

46. A lens according to claim 45, wherein said drive source comprises a motor, and wherein said generating means includes a detecting member which generates said pulse signal in response to the rotation of said focus ring, and wherein said first detecting means includes a detecting member which generates a signal corresponding to the rotating direction of said focus ring, and wherein said second detecting means includes a detecting circuit which detects the amount of rotation of said focus ring on the basis of the number of pulses of said pulse signal generated by said pulse generating means.

47. A lens according to claim 46, wherein said detecting member in said pulse generating means and said detecting member in said first detecting means are arranged as a common structure.

* * * * *

UNITED STATES PATENT AND TRADEMARK OFFICE
CERTIFICATE OF CORRECTION

PATENT NO. : 4,864,344

DATED : September 5, 1989

INVENTOR(S) : Arakawa, et al.

It is certified that error appears in the above-identified patent and that said Letters Patent is hereby corrected as shown below:

Title page:

[56]... Attorney, Agent, or Firm—:

"Fitzopatrick," should read --Fitzpatrick,--.

COLUMN 1:

Line 10, "and drive" should read --and to drive--.

Line 43, "s" should read --is--.

Line 64, "dog clutch" should read --a dog clutch--.

COLUMN 3:

Line 7, "side" should be deleted.

COLUMN 8:

Line 11, "in" should read --is--.

Line 64, "ODSW" should read --OLDSW--.

COLUMN 9:

Line 1, "debayed" should read --delayed--.

Line 52, "is in" should read --is stored in--.

UNITED STATES PATENT AND TRADEMARK OFFICE
CERTIFICATE OF CORRECTION

PATENT NO. : 4,864,344

DATED : September 5, 1989

INVENTOR(S) : Arakawa, et al.

It is certified that error appears in the above-identified patent and that said Letters Patent is hereby corrected as shown below:

COLUMN 12:

Lines 13 and 16, "direction" should read --detection--.

COLUMN 13:

Line 48, "o" should read --of--.

Line 66, "interval said" should read --interval from said--.

COLUMN 17:

Line 10, "drive setting circuit" should read --drive amount setting circuit--.

Line 11, "direction" should read --detection--.

UNITED STATES PATENT AND TRADEMARK OFFICE
CERTIFICATE OF CORRECTION

PATENT NO. : 4,864,344

DATED : September 5, 1989

INVENTOR(S) : Arakawa, et al.

It is certified that error appears in the above-identified patent and that said Letters Patent is hereby corrected as shown below:

COLUMN 18:

Line 56, "first detecting mans" should read --first detecting means--.

Signed and Sealed this

Eleventh Day of December, 1990

Attest:

HARRY F. MANBECK, JR.

Attesting Officer

Commissioner of Patents and Trademarks